(12) United States Patent
Jones

(10) Patent No.: US 7,195,731 B2
(45) Date of Patent: Mar. 27, 2007

(54) METHOD FOR PREPARING AND PROCESSING A SAMPLE FOR INTENSIVE ANALYSIS

(75) Inventor: Christopher M. Jones, Missouri City, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 162 days.

(21) Appl. No.: 10/618,781

(22) Filed: Jul. 14, 2003

(65) Prior Publication Data

US 2005/0012244 A1    Jan. 20, 2005

(51) Int. Cl.
*B29B 9/00* (2006.01)
*B29B 13/10* (2006.01)
*G01J 3/00* (2006.01)
*G01N 1/00* (2006.01)

(52) U.S. Cl. .................. 264/400; 73/863; 264/109; 264/140; 264/236; 264/463; 356/318

(58) Field of Classification Search ............... 264/109, 264/140, 236, 400, 463; 73/863; 356/318
See application file for complete search history.

(56) References Cited

U.S. PATENT DOCUMENTS

| | | | | |
|---|---|---|---|---|
| 2,965,610 | A * | 12/1960 | Newey | 528/115 |
| 3,567,808 | A * | 3/1971 | Smith | 264/29.7 |
| 5,751,416 | A | 5/1998 | Singh et al. | |
| 5,798,832 | A | 8/1998 | Hnilica et al. | |
| 6,362,475 | B1 | 3/2002 | Bindell et al. | |
| 6,366,353 | B1 | 4/2002 | Brown et al. | |
| 6,407,811 | B1 | 6/2002 | Snyder et al. | |
| 2002/0193237 | A1 * | 12/2002 | Messing et al. | 501/136 |

OTHER PUBLICATIONS

I. Bauman, *Solid-Solid Mixing With Static Mixers*, Chem. Biochem. Eng. Q. 15 (4) 159-165 (2001).

André Bakker, Richard D. LaRoche, and Elizabeth M. Marshall, *Laminar Flow in Static Mixers with Helical Elements*, Static Mixer, Kenic, Computational Modeling, Laminar Flow, "The Online CFM Book" at http://www.bakker.org/cfm(1998) (Updated:Feb. 15, 2000), pp. 1-11.

Joseph F. Becker, Todd B. Sauke, and Max Loewenstein, Stable isotope analysis using tunable diode laser spectroscopy, Applied Optics (Apr. 20, 1992) vol. 31, No. 12, pp. 1921-1927.

Peter Bergmaschi, *Measurements of stable isotope ratios ($^{13}CH_4$/ $^{12}CH_4$; $^{12}CH^3D/^{12}CH_4$) in landfill methane using a tunable diode laser absorption spectrometer*, Global Biogeochemical Cycles (Dec. 1995) vol. 9, No. 4, pp. 439-447.

Peter Bergamaschi, Michael Schupp, and Geoffrey W. Harris, *High-precision direct measurements of 13CH4/12CH4 and 12CH3D/12CH4 ratios in atmospheric methane sources by means of a long-path tunable diode laser absorption spectrometer*, Applied Optics (Nov. 20, 1994) vol. 33, No. 33, pp. 7704-7715.

Z. Tadmor and C. G. Gogos, "*Principles of Polymers Processing*" (Winter 2002-2003) http://www.eng.uc.edu/~gbeaucag/Classes/Processing/Chapter4.pdf http://www.eng.uc.edu/~gbeaucag/Classes/Processing/Syllabus.html.

* cited by examiner

*Primary Examiner*—Leo B. Tentoni
(74) *Attorney, Agent, or Firm*—Conley Rose, P C

(57) ABSTRACT

This application relates to a method for pellerizing and taking intensive measurements of a raw sample. The method includes homogenizing and pelletizing the sample that is to be subjected to compositional or intensive analysis. The raw sample is mixed with several solutions containing epoxies and activators based in carrier solutions or solvents, and ground to a fine powder or gel. The gel is partially dried and conformed to a pellet shape. The pellet is then cured such that the epoxy and activator solutions react and form a binding agent capable of maintaining the structural integrity of the sample pellet during intensive analysis. An intensive analysis instrument, such as LIBS, may then be used to ablate the surface of the pellet. The pellet provides consistent ablation of the sample material for accurate intensive measurements.

67 Claims, 1 Drawing Sheet

METHOD FOR PREPARING AND PROCESSING A SAMPLE FOR INTENSIVE ANALYSIS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates to compositional analysis of a prepared sample. More particularly, the present invention relates to the preparation of samples such that they may be analyzed for their constituent components via laser induced breakdown spectroscopy (LIBS), or some similar technique of intensive analysis. Still more particularly, the samples may be prepared from any solid sample which is grindable, and, even more particularly, the samples may be prepared from the drilled cuttings of a subterranean wellbore.

2. Background and Related Art

There are many situations where it is necessary or desirable to obtain substantially instantaneous and/or immediate major and trace constituent analysis of a sample material. Sample materials may include geological samples, soil samples, powder metallurgy, ceramics, food, pharmaceuticals, and many other materials. There are many reasons why it would be necessary to test these materials for their composition of components. For example, when drilling a subterranean well for oil or gas, it may be necessary to periodically analyze the drilled cuttings that are returned to the surface. The data from the analyzed cuttings will describe the formation being drilled, and thereby allow the driller to adjust the drill plan accordingly.

Many analytical instruments are known in the art that can provide data, such as compound or elemental composition (absolute or relative), spectral response, and others. These various instruments all have in common their use of an energy source, which when used to perturb the sample, results in a measurable response. These instruments may be differentiated from each other by the type of energy source employed, i.e., beam, sound, spark, etc., and/or the manner of response detection. The specific output parameters resulting from the analysis, as well as the accuracy, repeatability, and timeliness of the results, are all highly dependent not only on the specific instrument type, but also on the specific form and physical characteristics, including integrity and homogeneity, of the sample being subjected to the analysis.

Often solid samples must conform to a specific shape to be analyzed by commercial analysis equipment. The process of conforming and binding the samples into a specific shape is generally known as palletizing or pressing, and is well known in the industry. Sometimes the typical pellet pressing equipment and binders are suitable for commercial analysis techniques, such as the scanning electron microscope (SEM) or X-Ray Fluorescence Spectroscopy (XRF) techniques. These techniques are non-intrusive (non-shock) or low impact, and do not rely on the physical integrity of the sample. In addition to the normal pellet pressing equipment for SEM/XRF samples, other preparation processes known in the art have also been employed for samples that experience no shock. Examples of prior art binders used in no-shock pellets include cellulose and lithium metaborate. However, the SEM/XRF-type sample preparation is inadequate where the sample must maintain physical integrity while experiencing external stress due to testing.

Recently, a process of applying a forceful laser beam to a target sample called laser induced breakdown spectroscopy (LIBS), or laser-induced plasma spectroscopy (LIPS), has been used as a tool for real-time, in situ, primary composition and impurity analysis. LIBS instruments are known as "intensive" devices because they apply energy in such a away as to produce mechanical stresses (via shockwaves) in the analyzed sample. The forceful beam or laser creates a force at impact that is induced not by collision, but by radiant energy. The radiant energy produces a mechanical form of kinetic energy.

LIBS is a useful method for determining the elemental composition of various solids, liquids, and gases. Referring now to FIG. 1, in the LIBS technique, a high power laser pulse 20 is focused on to a sample 30 to create a plasma or laser spark at test point or focal region 22. The spark in the focal region 22 generates a high density plasma plume 26 which produces and excites various atomic elements. Atomic emission 24 from the plasma may be collected with a collimating lens or fiber optics, and analyzed by a spectrograph and gated detector. The atomic spectral lines can be used to determine the elemental composition or the elemental concentrations in the sample. The analysis is similar to that performed by an inductively coupled plasma (ICP) analyzer, known to those skilled in the art.

LIBS can be applied using a variety of lasers, but typically excimers or pulsed Nd:Yag lasers are used. The high intensity laser pulse 20 interacting with sample 30 produces a plasma plume 26 that evolves with time from the point of impact 22 of the incident laser pulse. The laser pulse usually lasts for less than 20 nanoseconds (ns). Emissions 24 from plasma plume 26 are collected and analyzed by the detection system. Typically emission 24 is collected at some distance from sample 30 to reduce the effect on the data from self-absorption effects or surface effects. Ideally, the plasma created breaks down all the sample's chemical bonds and ionizes many of the constituent elements. The spectral emission occurs as a result of the subsequent relaxation of the constituent excited species.

For a more detailed explanation of LIBS devices and technology, reference is made to U.S. Pat. No. 5,751,416 to Singh et al., entitled Analytical Method using Laser Induced Breakdown Spectroscopy, which is incorporated herein by reference as though fully set forth in its entirety.

A major advantage of LIBS is that it is relatively easy to set up and is field deployable. LIBS can also be more accurate relative to SEM and other non-intrusive techniques. In practice, a very small amount of the sample material is ablated by the laser. However, the sample pellets undergo stresses during the LIBS process as the laser ablates the surface of the pellet. The force of the laser striking the surface of the pellet creates a shock, which destroys many samples produced via classical SEM preparation methods. For this reason, it has been difficult to explore new disciplines, such as geological and environmental analysis, with LIBS.

For geological and environmental analysis, soil and rock samples are the primary focus for processing. To be properly analyzed using LIBS, the soil and rock samples must, among other things, be homogeneous. Typically soil and rock samples are not naturally homogeneous, thus they must be processed into a homogeneous, properly-sized sample pellet. First, the soil and rock samples must be broken down into unconsolidated particles, usually by being ground to an extremely fine powder. A powdered sample may be defined as a sample of sufficiently ground particle size such that measurements taken by the analysis device will be representative of the whole sample. Such representative measurements require homogeneity of the sample to be retained throughout the pellet preparation process and ultimately preserved in the final pellet. The term powdered sample makes no reference to the concentration of liquids surrounding or in contact with the sample particles—the powder may be wet or dry. The powdered geological sample particles, on average, must be smaller than about 25 microns ($10^{-6}$ m) in diameter, as is required by homogeneous sampling. Smaller particles are more desirable, but difficult to achieve via dry grinding methods and other methods used in conventional sample preparation methods.

Next, the powder is converted or reconstituted into a single solid unit. However, because the particles are so small, the sample is not easily bound such that it can withstand the stresses and shocks of the LIBS process. In addition to particle size, structural integrity depends largely on the binder used, and conventional prior art binders are not strong enough to withstand the laser shock from LIBS. Furthermore, it is difficult to mix conventional binders, such as cellulose and lithium metaborate, homogeneously with the powdered sample.

Due to LIBS detection limitations, it is important for measurement accuracy that the sample not be largely diluted by the binder such that the measurement is adversely destabilized. Conventional binders tend to limit the amount of material that is ablated because they remain present in the finished sample in significant quantities even after the pelletizing process. Therefore, a good binder will be present in low concentrations in the final sample pellet which allows for more uniform measurements.

Other characteristics of a good binder include: 1) the ability to cure the sample on demand, i.e., delay the commencement of curing, while at the same time having a short cure time without subjecting the sample to degradation from temperatures greater than 600° C. (1112° F.), 2) a minimal amount of epoxy required to bind the sample, and 3) consistent ablation characteristics of the sample during LIBS.

However, conventional binders and sample preparation techniques lack these characteristics, as well as other characteristics, including a prepared sample having a structural agent that maintains certain levels of structural integrity while being subjected to forceful beam analysis. The present invention overcomes certain deficiencies of the prior art.

SUMMARY OF THE PREFERRED EMBODIMENTS

In accordance with a preferred embodiment of the invention, a process is provided for improved compositional or intensive analysis of samples subject to physical stress. In one aspect, the invention is directed to a process for pelletizing the sample that is to be subjected to compositional or intensive analysis. In another aspect, the invention is directed to the application of intensive analysis to the pelletized samples such that the pelletized sample maintains structural integrity and provides consistent ablation of the sample material throughout the intensive analysis.

In one embodiment of the invention, a method for homogenizing a raw sample is disclosed including measuring out a portion of the raw sample; measuring out a volume of a first solution; measuring out a volume of a second solution; combining the sample portion, the first volume, and the second volume to form a mixture; and grinding the mixture. The first solution may be an epoxy in a carrier solution, such as C4 Resin in a solvent having isopropyl alcohol and acetone. The second solution may be an activator in a carrier solution, such as Activator D in an isopropyl alcohol and acetone solvent. The grinding step produces a mixture in gel form. The mixture will be homogenous and have other characteristics making it suitable, except for shape and hardness, for intensive analysis.

In another embodiment of the invention, a method for pelletizing a raw sample is disclosed including measuring out a first portion of the raw sample; measuring out a volume of an epoxy solution having a solvent; measuring out a volume of an activator solution having the solvent; combining the first sample portion, the epoxy solution volume, and the activator solution volume to form a spiked sample; grinding the spiked sample; heating the spiked sample; and applying a force to the spiked sample to form a first pellet. The force may be applied by a press and die mechanism. The pellet may further be cured such that the epoxy and activator solutions form a binding agent within the pellet that enable it to maintain structural integrity during intensive analysis, as well as provide consistent ablation of the sample material.

A primary objective of the present invention is to maintain the structural integrity of a sample material during intensive beam analysis, particularly for repeated analysis and consistent ablation of the sample. That is, an objective of the present invention is to increase the structural threshold of the sample above that required to resist the intensive measurement impact.

Another objective of the present invention is efficient homogenization of the sample material so that a more representative sampling of whole composition is achieved.

Yet another objective of the present invention is a grinding process that achieves a finer mean particle size and a substantially uniform particle-size distribution for a more characteristic sampling.

Still another objective of the present invention is a low concentration of the binding agent in the final sample pellet so that the spectral signatures of elements in the sample, which are directly related to their true abundance and hence accurate measurement, are not significantly affected by the presence of epoxy.

A further objective of the present invention is a consistent concentration and homogeneous distribution of the binding agent within the final sample pellet, which will increase the structural integrity of the sample, normalize structural matrix effects, and normalize the ablation effect.

These and other objects and advantages provided by the various embodiments of this invention will be readily apparent to those skilled in the art upon a review of the specification and drawings which follow.

BRIEF DESCRIPTION OF THE DRAWINGS

For a detailed description of a preferred embodiment of the invention, reference will now be made to the accompanying drawings wherein.

NOTATION AND NOMENCLATURE

Figure 1:
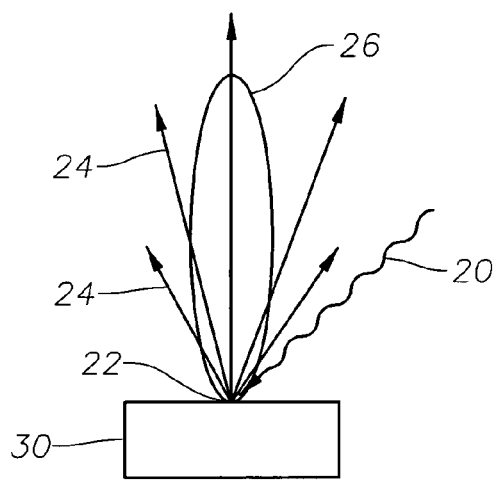
FIG. 1 shows an elevational view of the plasma forming portion of the laser induced breakdown spectroscopy process.

In the following discussion and in the claims, the terms "including" and "comprising" are used in an open-ended fashion, and thus should be interpreted to mean "including, but not limited to . . . ". Reference to "spiked" or "spiking" is intended to implicate a raw sample that has been combined with one or more of a solvent, epoxy, and/or activator. Generally, the cementing agent binds the particles of ground sample once the pellet has been formed. The cementing agent will typically be formed from a binding agent, such as an epoxy. The cementing agent, or its constituent parts, will be suspended and/or delivered via a carrier solution such as a solvent. The activator is a trigger that starts the cementing or curing process.

"Intensive," as in, "intensive device" or "intensive measurement," refers to the application of energy in such a way that mechanical stresses are experienced within the measured sample. For example, an intensive measurement may include application of a laser to the surface of a pellet during a LIBS measurement such that a shock wave is induced within the sample.

An "impact" is typically a collision between two bodies. More generally, it is described as a change in momentum within a time frame resulting in a force. The force induced is often called the force of impact. The impulse is the quantifying concept that relates the force, time and change in momentum. That is, the impulse is defined as the change in momentum, with momentum being force multiplied by time. Therefore, impact is well defined by two parameters with the third being fixed. With respect to intensive analysis, a change in momentum takes place in the sample thereby creating an impulse. Where radiant energy is applied to a sample, although there is not a collision of two bodies, the radiant energy can be said to have a momentum equal to the energy of the radiant energy divided by the speed of light. Application of radiant energy will induce an impulse within the sample capable of mechanical deformation, which can be described in the same way as previously defined.

"Sample integrity" or "structural integrity" refers to the ability of a sample to rebound after the influence of a deforming force.

The present invention is susceptible to embodiments of different forms. There are shown in the drawings, and herein will be described in detail, specific embodiments of the present invention, including a process for preparing a raw sample and application of intensive analysis to such sample. This exemplary disclosure is provided with the understanding that it is to be considered an exemplification of the principles of the invention, and is not intended to limit the invention to that illustrated and described herein. In particular, various embodiments of the present invention provide a number of different constructions and methods of operation, and modifications thereof can be made by one skilled in the art without departing from the spirit and teachings of the invention. It is to be fully recognized that the different teachings of the embodiments discussed below may be employed separately or in any suitable combination to produce desired results.

DETAILED DESCRIPTION OF SOME OF THE PREFERRED EMBODIMENTS

In the following description of the preferred embodiments of the invention, a raw sample is processed into a pellet form such that it can be subjected to compositional analysis. The raw sample may consist of any number of materials, such as geological or environmental substances, powder metallurgy, ceramics, food, pharmaceuticals, or others. However, for clarity and ease of description, the sample described herein will consist mainly of the drilled cuttings gathered from a subterranean wellbore drilling process. Also, the compositional analysis technique used to analyze the pelletized sample may include any number of techniques, such as SEM, XRF, or LIBS, although the pelletized sample described herein is especially suited for an intensive measurement "forceful beam" technique such as LIBS. A forceful beam technique may be used to make either an elemental or molecular compositional measurement of the pelletized sample.

The pelletizing process described herein consists of three main phases: 1) homogenization, 2) conformation, and 3) curing. Homogenization involves mixing the raw sample with a cementing agent, or epoxy, and grinding the cuttings/epoxy mixture so that the consistency of the "spiked" sample is uniform. It is preferred that the homogenization be retained until completion of the curing process. Conformation involves molding the pellet into the required shape for analysis. Lastly, curing of the sample pellet drives the cementing action, thereby increasing the structural threshold of the pellet so that the sample retains structural integrity throughout the intensive analysis process.

The first phase, homogenization, transforms a raw sample into a mixture which is suitable in consistency for analysis but not shape or hardness. Homogenization includes several sub-steps. First, a sample of the drilled cuttings must be obtained from the drilling process. This can be done by filtering out cuttings from the drilling mud that has returned to the surface after being circulated down through the drill string and out through the drill bit. It should be understood that the use of drilled wellbore cuttings in this description is not intended to limit application of the invention to such, but is simply illustrative of the process that may be used for any sample that is to be analyzed.

After obtaining a sample of the drilled cuttings, it is necessary to measure out a small portion of the cuttings. Preferably, between 0.45 grams and 0.50 grams of cuttings are measured out, although the process may be scaled depending on what the final pellet size is to be. The sample is then combined and mixed with a carrier solution or solvent, an epoxy, and an activator.

Although the cuttings, solvent, epoxy, and activator may be combined at one time, preferably the combination is separated into steps. First, an epoxy solution is formulated including a carrier solution and the epoxy. Second, an activator solution is formulated including a carrier solution and the activator. The formulations optimize the epoxy concentrations and carrier properties for homogeneity and measurement stability. Next, the optimally designed volume of the epoxy solution, preferably about 0.50 mL for a 0.5 g sample, is added to the cuttings. Then, the optimally designed volume of the activator solution, preferably about 0.50 mL for a 0.5 g sample, is added to the mixture of cuttings and epoxy solution. The combination of the cuttings, epoxy solution, and activator solution includes all of the ingredients of and forms the spiked sample from which the final pellet will be formed. The combination of the epoxy solution and the activator solution, minus the cuttings sample, may be collectively known as the "spiking agent." The spiking agent formulation is designed so that the volumes of fluids preferably form a gel with the sample particles upon grinding of the spiked sample.

The epoxy and activator solutions are specially designed formulations. The carrier solution is a mixture of off-the-shelf solvents used to dissolve, but not interfere with, an independent, two-part (epoxy and activator) off-the-shelf cementing agent which may be removed from the homogenized and conformed sample easily upon demand. Each of the two parts of the cementing agent are dissolved into similar carrier solutions in two separate containers. The two parts of the cementing agent are kept separate because, when they come into contact, the curing action starts and the cementing agent starts to harden. Although the normal cure time for the cementing agent at room temperature is about three days, it is important to the overall pelletizing process to keep the cementing agent ingredients separate and delay curing until the pelletizing process, and more particularly homogenization, has begun. This becomes especially important when higher temperatures are used to pre-dry and dry the spiked sample, because higher temperatures will reduce the cure time to only several minutes at the higher temperatures. Moreover, the sample binder must be mixed with the raw sample and not cured immediately because the sample still must be molded.

Both the epoxy and activator solutions are based in an isopropyl alcohol/acetone carrier solution. The carrier solution contains about 90% by weight isopropyl alcohol and about 10% by weight acetone. For the epoxy solution, approximately 0.0633 grams of C4 Resin per mL of carrier solution completes the solution. For the activator solution, approximately 0.0158 grams of Activator D per mL of carrier solution completes the solution. Neither acetone nor isopropyl alcohol will work alone as the carrier solution to produce a suitable gel because acetone evaporates too quickly and will not form a gel, and isopropyl alcohol will not dissolve the epoxy.

The above-described proportions for the epoxy and activator solutions are well-suited for a number of requirements presented by a LIBS-based geological well site analysis device. The different concentrations have been specifically optimized for the type and size of samples normally studied at geological well sites with the LIBS device. After combining the measured solutions and creating the spiking agent, the resulting volume of the spiking agent is such that the homogenized sample will gel properly, the fluid present in the mechanical grinder will induce maximum grinding effects, and the concentration of the cementing agent will be such that the samples have maximum lithification characteristics while maintaining a low cementing agent to raw sample weight ratio in the final pellet for best analytical results. However, the concentrations of the epoxy, activator, and carrier solution may be varied depending on the sample studied.

The next step in the homogenization phase requires that the spiked sample be ground or pulverized. Generally, very small particle sizes are desirable because homogenization of the sample increases as particle size decreases. Also, LIBS requires small particle sizes to produce accurate measurements. Grinding the spiked sample such that a significant number of the particles have a particle size of less than 25 microns ($10^{-6}$ m) in diameter is desirable, with a mean diameter of less than 5 or 6 microns being most desirable. This size is also necessary for a gel to form for a 0.5 g sample and 1 ml total liquid.

Uniformly sized particles are also desired, and a liquid carrier helps with even grinding. If the sample is ground finely enough, and the solvents and other liquids combined with the sample are in the correct proportions, a gel may be produced. More particularly, when the ratios of solvent to epoxy, and liquid to a given mass of solids of given particle size are correct, a gel is formed. A gel may generally be defined as a thixotropic mixture of solid particles suspended within a liquid, wherein the mixture is resistant to internal segregation, differentiation, or settling of materials. The particles are neutrally buoyant within the gel. The gel is viscous and resistant to flow, but may flow when agitated. When the mixture is at rest, the particles remain substantially fixed in position with respect to each other.

Thus, a gel is desirable to maximize homogeneity of the sample. Homogeneity is achieved best in a gel because a finely ground powder dispersed within a gel experiences little internal relative particle movement, and the particles are also neutrally buoyant. Separation or settling of larger particles with respect to the smaller particles, which destroys homogenization, is minimized compared to samples mixed with other liquids or dry samples.

There are various grinding techniques and equipment available to grind the sample, as is well known in the art. Some grinding techniques require dry grinding, while others allow wet grinding of the sample. With machine grinding, wet grinding usually produces smaller particle sizes more quickly with a more even distribution, and is therefore often the method of choice.

Even with wet grinding, the sample particle size may still remain too large for proper LIBS analysis. This is where the combination of the raw sample with the spiking agent further enhances the results of grinding. One of the advantages of spiking the sample with the previously described solutions for wet grinding includes achieving smaller particle sizes than is possible with other liquids, and therefore increased homogeneity for both the sample particles with respect to other particles, and the solution containing the binding agent with respect to the sample particles. Additionally, the spiking agent helps maintain homogeneity throughout the pelletizing process, whereas homogeneity may be lost using other liquids or dry grinding. Regardless of size, the sample particles are easily mixed and homogenized with respect to the spiking agent. Thus, the difference between conventional wet grinding and wet grinding according to the present invention is the increased chance that the powdered sample combined with the spiking agent will gel properly upon wet grinding.

If dry grinding of the raw sample is desired, then the epoxy and activator solutions may be added later in the pelletizing process. For example, a dry, powdered sample may be mixed with the solutions after the grinding process. Under these circumstances, the compound's ability to gel is largely dependent on the particle size distribution of the ground sample. At best, the sample gels easily. However, differentiation of the sample particles may occur and the predictability of forming a gel decreases with dry grinding.

Grinding the spiked sample concludes the homogenization phase of the pelletizing process. The next phase of the process is called conformation, and begins with applying heat to the ground sample to induce drying of the sample. Also called pre-curing, drying involves driving off the solvent, substantially evaporating the alcohol-acetone solvent but not fully curing the sample. Preferably, a high temperature is suitable initially to eliminate a substantial portion of the solvent. The presence of some solvent keeps the temperature of the sample below the curing point of a heat-cured sample so long as the boiling point of the solvent is below the cure temperature of the cementing agent. This is another advantage of the particular carrier chosen. The sample is completely dried at a lower temperature than that of the solvent-drying temperature, which will finish the drying process but not cure the sample. Also note that gelling during homogenization minimizes differentiation during drying.

The homogenized and dried sample is then deconsolidated (repowdered) and dry-mixed for the purpose of minimizing a film effect that may have occurred in the drying step. Film effect occurs when a slight increase in fluid volume is experienced at the outer layer of the gelled sample due to osmotic pressure. The increased fluid volume is a film that surrounds the gelled sample at its outer boundary. When the solvent is removed or driven off, the film results in a slight enrichment of the epoxy binder in contact with the outer layer of sample particles as opposed to the internal sample particles. Typically, the depth of the film effect is only the width of a few particles, and the analytical effect of the film is generally minimal. However, film effect is eliminated when possible due to its ease of removal and uncertain effects on all types of samples.

The first application of heat at a high temperature is a "pre-drying" step. Rapidly pre-drying the sample at a high temperature such as not to cure the sample will significantly reduce the total drying time for the sample. For example, a temperature in the range of 350° F. to 370° F. (177° C. to 188° C.) may be applied to the sample for approximately 1 minute. However, care must be taken not to overdry the sample at this point. The alcohol-acetone solvent initially keeps the temperature of the epoxy additives below their curing point. As the solvent is evaporated, however, the temperature of the sample material will begin to rise past the curing point. A properly pre-dried sample will be just drier than a supersaturated gel-like suspension, and will have a sticky, mud-like consistency. A properly pre-dried sample may be identified by a sudden change in surface tension resulting in identifiable meniscuses of supersaturated gel along the pre-dried portion.

When pre-drying has been adequately completed, the sample is subjected to a temperature below, and preferably significantly below, the pre-drying temperature. For example, a steady drying temperature of 155° F. (68° C.) may be applied to the sample for about 4 minutes. It should be understood that this drying temperature may be higher or lower than 155° F. (68° C.). Because the drying temperature is much lower than the pre-drying temperature, not as much caution is needed to prevent overdrying of the sample. Thus, if necessary, the sample may be left on the hot plate longer than 4 minutes, since the temperature is too low to initiate curing. After drying is complete, the sample will typically have a delicate, flaky consistency.

As first mentioned above, the dried sample is now deconsolidated from flakes and re-mixed, which may be accomplished by firmly rubbing the flakes by hand with a clean barrier, such as a sheet of paper. Alternatively, the sample can be re-mixed in any manner desired such that the sample has a nearly uniform color and surface texture. Non-uniform appearance or texture indicates an undesired film effect is prevalent. Additionally, if there is any slight in homogeneity due to an unseen limitation of the process to this point, deconsolidation and remixing should remove the slight as well as any non-uniformities.

The re-powdered sample can now be placed in a press or die. When pressure is applied, the sample is molded or conformed into a pellet or any other desired shape. While not as delicate as a pellet ground without the epoxy solution, the pellet must still be handled with care until the curing step is completed. Once the pellet has been pressed, the conformation phase is complete.

The formed pellet is now ready for curing, the final phase in the pelletizing process. To cure, heat is again applied at a high temperature for a length of time. This final application of heat causes the separate, constituent elements of the binding agent, such as the epoxy and activator, present in the pellet to react and synthesize into the binding agent. For example, heat may be applied in the same high temperature range as mentioned before, from 350° F. to 370° F. (177° C. to 188° C.), for about 3 minutes, with a cooling time of approximately 1 minute. At 355° F., the sample is cured in approximately 3 minutes. After curing, the sample will have an approximate ratio of 98% by weight sample and 2% by weight binder. Typically, the weight of the cured binder is approximately ⅓ the weight of the uncured binder.

Although heat activation has been described as the method for pre-drying, drying, and curing the sample, other methods for drying and/or curing cementing agents are well known in the art, and may be used with the present cementing agent. One such method is the application of ultra violet (UV) rays. Alternatively, the sample may be dried using one method and cured using another.

Referring back to the curing phase, it has been found that, although time cured, cementing or binding agents have limitations in either the fixed sample preparation time or cure time. In certain situations, one may desire to wait long periods of time between steps of preparation and then analyze after curing has taken place. Alternatively, one may desire to expedite the preparation process and then analyze the sample. Although the current binder has been chosen to allow much leeway in binding timing, different types of cementing or binding agents can be used depending on the time parameters desired.

Two categories of cementing agents are heat cured and UV cured. These two types of cementing agents work well and are complimentary. It has been found that UV curing works well even for opaque samples since the cementing agent itself conducts light and forms a fiber optic effect in the microcavities formed from a powdered sample, driving light deeper to cure more of the homogenized sample. This, however, requires a strong UV source. Heat cured binders are simpler but dependent on the sample. Not all samples may be heated. The main requirement for any cementing agent to be strongly desirable is stability until a trigger is applied which causes curing. Other curing triggers include cooling and electricity.

For UV cured cementing agents, the hereinabove described process would be identical with the exception of the use of UV light in the final step for the purpose of curing. UV-cured epoxy is satisfactory, although it requires a strong UV source to cure quickly.

Now, a method representing one embodiment of the present invention will be described in detail (single-pellet procedure):

1) Label a polyethylene weighing boat and disposable funnel to associate them with the specific sample being prepared. The weighing boat is VWR International Part Number 12577-005.

2) Place the weighing boat on a small field scale and tare it. The scale is a Heusser NeWeight Model CM60-2.

3) Measure out between 0.45 grams and 0.50 grams of the gathered drilling cuttings on the small field scale, and record the exact weight.

4) Pour the weighed cuttings from the weighing boat into an agate vial. The agate vial body has a stainless steel outer jacket.

5) Clean the weighing boat with a burst of compressed air, as it will be used again during preparation of this sample.

6) Place an agate ball into the agate vial with the cuttings.

7) Dispense 0.5 mL of the previously described epoxy solution into the agate vial. The dispenser containing the epoxy solution is a VWR International Part Number 53526-672, 0.1–2.0 mL, and will automatically dispense the predetermined volume when the button is depressed.

8) Dispense 0.5 mL of the previously described activator solution into the agate vial. The dispenser is similar to the one described in step 7 above, and will also automatically dispense the predetermined volume when the button is depressed.

9) Place the agate cap onto the vial, and bind it with a molded hose clamp to provide a tight seal. The top end of the agate cap should be beveled by a grinding wheel before use so that the cap receives the hose clamp properly. If the cap is not beveled, it will be chipped by the hose clamp, resulting in a poor fit and possible leakage of the sample mixture. Take care to make sure the hose clamp is tight, as the vials are not well-designed by themselves to avoid some leakage. The hose clamp will guard against this.

10) Secure the vial in position in one of the shaker brackets on the front of the mixer mill by screwing down the handle. The top of the vial (the end with the cap) should be facing inward, toward the middle of the mill. Again, take care to gently but firmly seat the vial in the bracket, so as to avoid any spilling. A counter weight is required in the other bracket during grinding, so it is necessary to secure another agate vial, without the agate ball (or an object of similar shape and weight) in the second bracket. Two samples can be ground together if the timing of the samples is amenable. The mill is a Glen Mills Model 1670-000700-1 High Speed Mixer Mill.

11) Grind the cuttings/epoxy mixture for 5 minutes at a frequency of 30 Hz.

12) While the sample is grinding, clean the spare stainless steel, 13-mm pellet die, piston, and anvils for the next run using 2% HCL solution in deionized water as a rinse. Use alcohol or acetone to dry the die components.

13) Also clean the spare agate vial, cap, and ball for the next run. Follow the sequence below (A through E), and note that this sequence may have to be completed after steps 14–17, which must be completed as soon as grinding is finished.

A) Dip the vial, the cap, and the ball into a water bucket to rinse bulk contamination. Clean off quickly using test-tube pipe cleaner in the water.

B) Rinse the vial, cap, and ball with acetone or isopropyl alcohol to remove any epoxy residue.

C) Dip the vial, cap, and ball in a bucket of 2% hydrochloric acid, and shake while immersed.

D) Rinse the vial, cap, and ball with tap water.

E) Dry the vial, cap, and ball with acetone or alcohol.

14) Once grinding has finished, carefully remove the active vial from the mill. Holding the vial in an upright position (cap end facing upward), gently tap the vial a few times on the counter top to settle the sample mixture into the bottom of the vial.

15) Loosen and remove the hose clamp, keeping the vial body and cap pressed firmly together with the fingers to avoid spillage.

16) Remove the cap from the vial body. If the cap fits tightly, take care to avoid spilling sample mixture while pulling it loose.

17) Using the cleaned weighing boat of step 5, invert the weighing boat and place it over the top of the opened vial and in contact with the lip of the vial. Overturn the vial keeping the weighing boat in contact with the vial lip. This will allow the vial to be overturned in a controlled manner so the sample mixture can be emptied back into the weighing boat for drying. After overturning the vial, allow it to sit upon the weighing boat for about one minute to drain as much sample from the agate jar as possible.

18) Gently lift the vial upward and allow the sample mixture to slowly spill into the weighing boat. The sample mixture will have a finely-ground, gel-like consistency.

19) Place the weighing boat on the packed blasting sand in a glass Petri dish on top of a high-temperature hot plate. The hotplate should be stabilized in the temperature range of 350° F. to 370° F. (177° C. to 188° C.), and preferably at approximately 355° F. (180° C.). This is the "pre-drying" step, and is a useful precursor to complete drying. The sample mixture should take about 1 minute to adequately pre-dry. While waiting for the sample mixture to "pre-dry," other weighing boats can be marked for the next samples to be prepared. By rapidly pre-drying on the high-temperature hot plate, and then transferring the weighing boat to the low-temperature hot plate (Step 20), the total drying time can be significantly reduced. A properly pre-dried sample will be just drier than a supersaturated gel-like suspension, and will have a mud-like consistency. The color of the sample will lighten perceptibly around the edges, an indicator that the material is becoming completely dry. It will still be moist and dark over most of the sample, possibly with a slight residual "puddle" in the middle. No more than 5% of the sample surface (around the edges) should become light-colored before the weighing boat is removed from the hot plate. It should be appreciated that care must be taken not to overdry the sample at this point, as the dried edges of the mixture may begin to cure if left on the high-temperature hot plate too long. The alcohol-acetone solvent initially keeps the temperature of the epoxy additives below the curing point. As the solvent is evaporated, however, the temperature of the sample material will begin to rise past the curing point. Additionally, if the sample completely dries while on the high-temperature hot plate, the weighing boat will melt, and the sample will be ruined.

20) When pre-drying is complete, remove the weighing boat and place it onto a low-temperature hotplate. This hotplate also consists of packed blasting sand in a glass Petri dish on top of a hotplate. The low-temperature hotplate should be stabilized at approximately 155° F. (68° C.) for final sample drying prior to pellet pressing. Final drying will take about 3 minutes. However, if necessary, the sample may be left on the hotplate for longer than 3 minutes, since the temperature is too low to initiate curing or to melt the weighing boat. If necessary, complete steps 1–9 for the next sample in line while waiting for final drying.

21) After the sample is dry, remove the weighing boat from the low-temperature hot plate. The visual criteria for adequate drying are: a complete absence of any dampness, the color is lighter over the whole sample, and the sample has the appearance of a thin, sun-dried "mud cake." The sample cake in the bottom of the boat is best removed by inverting the boat, placing it on a clean piece of printer paper (cut to about 5 inches by 5 inches), and tapping on the bottom of the inverted boat. This will loosen the powder cake and cause it to fall off in flakes onto the paper. If any residual material sticks to the boat, it can be scraped onto the paper with a plastic spatula.

22) Fold the paper in half, keeping the sample in the crease in the middle. Firmly rub the flakes of sample material together within the paper to deconsolidate the sample. This should be done for about 30 seconds. It should be appreciated that if this step is completed properly, the final pellet will have a nearly uniform color and surface texture. If not completed properly, the pellet surface will usually have a speckled, mottled, or brecciated appearance. This is an indicator of slight heterogeneity in epoxy distribution. If pellets do show a mottled appearance, increase the finger pressure while rubbing the sample together, and/or extend the time of remixing.

23) Prepare the cleaned, stainless steel pellet die by assembling the base, the body, and the lower anvil.

24) Pour the sample powder along the crease of the paper and into the cylinder in the body of the die. Tap the die several times gently on the counter top to settle the sample material into the cylinder. Place the upper anvil and plunger into the die cylinder.

25) Place the loaded die into the SPEX 3630 X-Press, and tighten down the top screw. The press should be programmed for a ram pressure of 5 tons, a hold time of 0.3 minutes (18 seconds), and a release time of 0.2 minutes (12 seconds). Close the safety shield and activate the press. Alternatively, any press may be used so long as the press parameters allow for proper pressing of the sample as described above, and the resultant pellet diameter is approximately 13 mm.

26) After the automatic pressing routine is completed, gently extract the pellet. While not as delicate as a pellet ground without epoxy solution, the epoxy-pellet still must be handled with care until heat-curing is completed.

27) Gently place the pellet onto the high-temperature hotplate for approximately 3 minutes. The timer should be set to alert the operator that heat-curing is completed. If necessary, complete steps 10–11 for the next sample in line while waiting for the heat curing to finish.

28) Remove the pellet from the high-temperature hotplate and allow it to cool for about 1 minute. When the pellet has cooled, it may be labeled with a marker and placed into the sample tray with the labeled side down. The labeled side can also be used for analysis if necessary, as the ink does not affect analytical quality.

If this procedure is followed, durable, high-quality pellets can be produced with a greater than 98% success rate. It should be understood that times given are for a single-sample process. If a multi-sample process is desired (as suggested by steps 20 and 27), longer times may be used for drying on the low-temperature hot plate (step 20), and for heat curing (step 27). Moreover, additional steps may be employed such that an assembly process is achieved whereby multiple pellets are produced consecutively.

Now, a method representing another embodiment of the present invention will be described below in detail (pre-powdered-pellet procedure). In this description, conditions are similar to the single pellet process. A letter designation is given to hypothetical samples for the purpose of tracking the procedure. Samples will be referred to as pellets once the pressing action has taken place; however the designation will remain the same. The steps of the pre-powdered-pellet procedure are as follows:

(1) At approximately the same time that the first sample (Sample A) is being placed on the high-temperature hot plate for pre-drying (step 19 of the single-pellet procedure), a seven-minute timer should be started.

(2) Weigh out a portion of the raw sample (Sample B) during the minute that Sample A is pre-drying in the weighing dish on the high-temperature hot plate. Approximately six minutes should be left on the timer.

(3) After one minute of pre-drying for Sample A, switch the weighing dish from the high-temperature to the low-temperature hot plate, and clean the press die from the last run, letting the die sit in an acetone bath until used. Approximately four and one-half minutes should now be left on the timer.

(4) Mix the raw Sample B portion of step (2) with the epoxy-acetone mixture. Place the eppendorf tube on the associated weighing dish near the high-temperature hot plate for the next run. Make sure to place another weighing dish on the scale and tare it for the next run (Sample C) as soon as Sample B is removed from the scale. Approximately three minutes should be left on the timer.

(5) Take the weighing dish with the dried Sample A from the previous run, tare and press the sample as described hereinabove. Approximately 30 seconds should be left on the timer.

(6) When the timer alarm sounds, remove the weighing dish holding now palletized Sample or Pellet A first. Place Pellet A in a location for cooling. Label Pellet A, which is now cool, and take the freshly dried weighing dish to the press for the next round. If care is taken with the hot pellet, the freshly cured pellet may be labeled when hot.

(7) Remove Pellet B from the press if this has not already been done. Place Pellet B on the high-temperature hot plate. As described in the single-pellet procedure, place Sample C, now in step (3) of the current pre-powdered-pellet procedure, onto the high-temperature hot plate sand bath and start the 7 minute timer. No more than approximately 30 seconds should elapse between the seven minute timer alarm sounding and the completion of step 7.

In an alternative embodiment of the invention (multi-pellet assembly procedure), pelletizing is achieved by an assembly process, which is based on the pelletizing processes (single pellet and pre-powdered-pellet procedures) described hereinabove. In describing the multi-pellet assembly procedure, a letter designation is given to hypothetical samples for the purpose of tracking the procedure, as was described above. Samples will be referred as pellets once the pressing action has taken place; however the designation will remain the same. The process will be described as an ongoing process, and therefore sample "A" does not refer to the first pellet that was produced when the process started. In this description, only sample "E" will be described from the start of the process, with each subsequent sample intended to illustrate the next stage of the assembly process in sequence. Also note that two mortar (vial) and pestle (ball) sets will be necessary for this process. The steps of the multi-pellet assembly procedure may be described as follows:

1) Take Pellet A off the high temperature hot plate just prior to the end of the 7 minute timer, Pellet A having been cured for more than 3 minutes on the high temperature hotplate. Label the pellet, and archive or analyze it.

2) Remove Pellet B from the pellet press die and place it on the high temperature hot plate for curing.

3) Remove the inverted grinding vessel from the weighing dish. The contents of the weighing dish should be the gelled contents of Sample D. Place the weighing dish on the high temperature hot plate sand bath. Start the 7 minute timer.

Note that this sample should not remain on the high temperature hot plate for more than 1 minute.

4) Remove Sample C from the low temperature hot plate and allow to cool.

Weigh 0.45 to 0.50 g of raw sample and record the exact weight as prescribed by conventional logging procedures. Generally, the combination of step 4 and step 5 should take less than 1 minute. If it appears that Sample D from step 3 will remain on the hotplate for more than one minute before the completion of step 5, then proceed to step 6 while subsequently returning to step 5. Step 7 may be started if there is ample time before Sample D needs to be removed from the high temperature hot plate.

6) After no more than 1 minute, or when the sample appears to be pre-curing, transfer Sample D from the high temperature hot plate to the low temperature hot plate.

7) Place the contents of the weighing dish (Sample E) into a fresh mortar vial with ball pestle already disposed at the bottom of the vial. Dispense 0.5 mL of epoxy solution and 0.5 mL of activator solution with the automatic dispensers. Cap the vial and secure with the clamp. Place the mortar and pestle in the grinder with the program of 30 Hz at 5 min, as previously described.

8) Clean the mortar and pestle used for Sample D.

9) Remove the contents of Sample C from the weighing dish. Remix and place in the pellet die. Place the pellet die in the press and operate with the pre-programmed sequence of 5 tons, with a hold time of 0.3 min and release time of 0.2 min. Pellets may be pressed with as little as 1,000 p.s.i. (1 ton) if the press is capable of increments that low. Pellets pressed at lower pressures have not been well characterized.

10) When the grinder with Sample E is at the end of the grinding sequence, remove the vial containing Sample E and place the vial inverted in the weighing dish used to measure the quantity of Sample E. This should allow the gelled contents of Sample E to drain.

11) Repeat the process starting at step 1 by incrementing all sample designations in this direction set by 1 letter value.

Using the single-pellet procedure, it takes approximately 15 minutes for an experienced technician to prepare a pellet for analysis. This amounts to 4 pellets completed per hour. The process has yielded 5 pellets per hour by experienced technicians who know how to reduce time to complete the drying, draining, and re-mixing steps. The multi-pellet assembly process speeds up pellet production by taking what would otherwise be dead time and preparing different stages of other pellets. As a batch process, the drying time of a sample in the weighing dish may be shortened to three minutes. The sample may be slightly damp without affecting the results. The cure time may also be shortened to three minutes.

The assembly process, however, produces a pellet every seven minutes. Because 4 pellets are in production in series, it takes 4 cycles of 7 minutes to produce a pellet. Therefore, the lag time is 28 minutes for the assembly process. This produces almost 9 pellets per hour. Experienced technicians have produced more than 9 per hour. This compares favorably with respect to the 4–5 pellets that can be produced using the single-pellet process.

The resultant pellets of the above-described process exhibit many beneficial characteristics not previously achieved, especially in combination. The two primary characteristics achieved are structural integrity, even when subjected to the degrading effects of intensive analysis such as LIBS, and consistent ablation of the sample material, which translates into consistent measurement. Structural integrity and consistent ablation, to varying and overlapping degrees, are functions of several categories of sample pellet attributes, including impact strength, particle bond strength, sample homogeneity, size distribution of ground sample particles, consistency and quantity concentration of the binding agent in the final sample pellet, and homogeneity of the binding agent in the final sample pellet.

Figure 2:
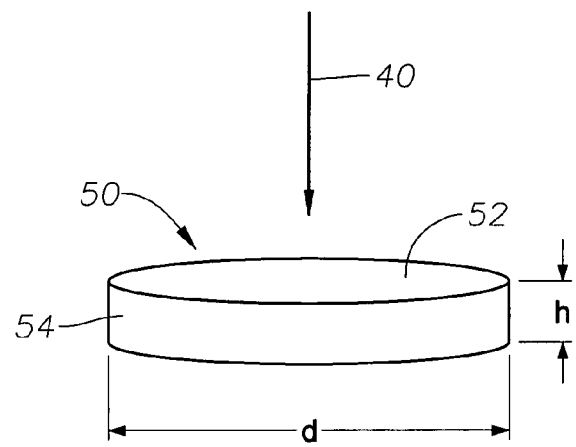
FIG. 2 shows a perspective view of a sample pellet formed by a preferred embodiment of the method described herein.
Figure 3:
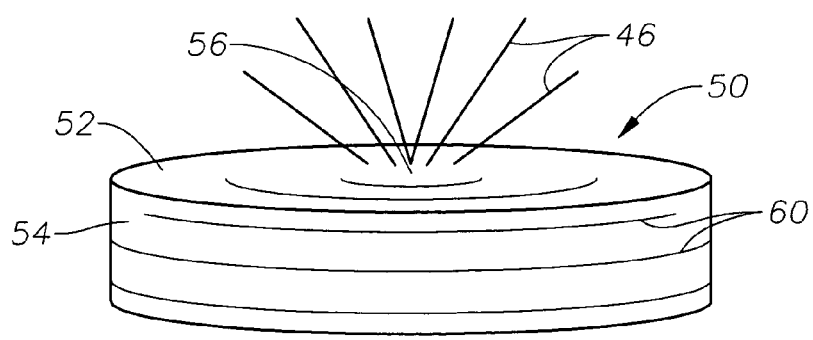
FIG. 3 shows an enlarged perspective view of the sample pellet of FIG. 3 wherein shock waves are resonating through the pellet as a result of an intensive measurement.

More specifically, sample structural integrity can be measured by impact strength, such as failure under mechanical point-load shock, compressive strength, and physical damage, such as "crater" or "collateral" geometry. With respect to impact strength, pellet limitations are dependent on the apparatus used to analyze the pellet. Given that intensive devices apply a unidirectional force, a shock wave results within the sample. Referring to FIGS. 2 and 3, pellet 50 is shown having a cylindrical side surface 54, a top surface 52, a diameter d, and a height h. A uni-directional force 40 is applied to top surface 52 of pellet 50 substantially perpendicular to surface 52. Preferably, force 40 is a high intensity laser pulse, such as laser pulse 20 seen in FIG. 1. FIG. 1 also shows that force 40 may be applied at an angle from perpendicular to surface 52, as is laser pulse 20. In FIG. 3, it can be seen that impact point 56 of laser 40 is the epicenter of plasma 46 and shock waves 60. Laser 40 causes plasma 46 to emanate from surface 52, as previously described with reference to FIG. 1, as shock waves 60 propagate throughout pellet 50.

Shock wave physics are complex, but generally it is found that the compressive strength of a material is an estimation of resistance to destruction by a shock wave. This estimation is especially applicable when the length or diameter of a sample (direction perpendicular to the incident force) is much larger than the height (direction parallel to the force). In the preferred embodiment, as shown in FIG. 2, pellet 50 has a diameter d to height h ratio of approximately 13 to 1, making the compressive strength estimation particularly valid.

Pellets produced by a preferred embodiment of the method of the present invention have been tested for compressional strength, and have been found to exhibit structural integrity under a constrained compressional force of up to 30 tons (73,000 p.s.i.) of ram pressure applied to the surface of the pellet. The constrained ram force is applied unidirectionally while the bottom and side surfaces are constrained. Therefore, the structural threshold, or the pressure at which the pellet will not rebound from a stress, of the pellets is above 30 tons (73,000 p.s.i.) under a constrained force. In the preferred embodiment, the intensive analysis instrument has a 1 MJ or more laser beam, which may exert a compressive force of approximately 4,500 Kpa (650 p.s.i.). Although the intensive analysis force exerted on the pellet is an analogous, unconstrained force to the ram force, the structural threshold of the pellet under ram pressure is sufficiently high to validate the structural integrity of the pellet when subjected to intensive analysis. Therefore, the pellets created using a preferred embodiment of the present method exhibit a structural integrity exceeding that required by intensive analysis.

Cratering (craters created by the forceful beam) are affected by many parameters. Of greatest influence are 1) the geometry of the incident energy source, 2) the magnitude of the incident energy source, and 3) the particle bond strength of the sample. Cratering is a change in the surface geometry of the sample as a result of the intensive measurement. For many measurement systems, including LIBS, the measurement itself is a function of the geometry. Therefore, for the most stable measurements, the rate of change of the geometry will be at a minimum. Geometry can change by scaling (proportions of geometry remain the same but not magnitude) and by conformation (relative proportions of geometry change). It has been found that the conformation geometry change has the highest influence on the LIBS measurement.

Particle bond strength is the measure of strength between particles that bind a sample together and resist ablation. Particle bond strength is one factor influencing the matrix of the sample. The matrix is a set of conditions that affects the relationship of a measurement to a property of interest. Higher particle bond strengths cause resistance to both scaling and conformation geometry changes, and thereby increase the analytical stability of the sample. Also, uniformity of particle bond strength throughout a sample unit has been found to affect measurements of different samples with identical compositions. By increasing particle bond strength, periods of measurement to measurement stability marked by minimal geometry change are extended to a greater number of measurements.

The present method 1) increases the particle bond strength for samples with identical compositions as compared to previous methods, and 2) normalizes the particle bond strength for samples of different compositions. Therefore, measurements are comparable for samples of differing matrix types. The present method eliminates or minimizes the sample matrix effect of particle bond strength. It is believed that this matrix effect is derived from the ablation of differing amounts of material having differing bond strengths for a given set of instrument parameters. The differing quantity of material ablated affects 1) the total quantity of material measured and 2) the conditions of the plasma for LIBS devices. Even when there are small changes in geometry using the present method, the changes tend to be similar for all samples, and the systematic variation is minimized. Therefore, the present method minimizes cratering geometric matrix effects.

In addition to reducing or eliminating cratering, it is desirable to minimize both collateral damage on the pellet surface near the crater and through-going fracture of the pellet. The pellets described herein exhibit remarkable resistance to collateral damage.

As previously noted, small and uniform particle sizes are very beneficial in sample pellet preparation and compositional analysis applications. Small particles and uniform distribution of the particles cause the desired "smoothing" of the laser-induced ablation effects. "Smoothing" is the process by which the laser-induced plasma consumes the sample particles in a consistent manner. Standard particle size distribution statistical tools may be used to characterize ground materials, including histograms, frequency curves, cumulation curves, mean particle size measurements, standard deviation, Trask sorting coefficient, skewness, kurtosis, and other well-known tools.

Appendices A1–A4 show exemplary particle distribution statistics based on particle diameter where several ground and unground samples have been characterized by various of the previously mentioned statistical tools. The samples include a raw, unground sand sample (Appendix A1), a hand ground sample (Appendix A2), a dry ground sample (Appendix A3), and a wet ground sample according an embodiment of the present invention (Appendix A4). It should be noted that the wet ground sample particle diameter exhibited the smallest standard deviation, meaning that the wet ground particles are closer in size than the particles of the other ground samples. With reference to Appendix A4, it can be seen that the wet ground sample exhibited a particle diameter standard deviation of 0.0066 mm, or 0.0003 inches. The next closest standard deviation of 0.0587 mm (0.0023 inches) can be seen in the hand ground sample (Appendix A2), which is approximately eight times larger than the standard deviation of the wet ground sample. It should also be noted that the raw sample of sand used was very coarse, and contained few constituents other than feldspar and quartz. Thus, this sand sample represents one of the more difficult to grind geological samples that will be encountered in an oilfield operation, and results are considered an upper limit with respect to particle size and particle size distribution.

The next sample pellet attribute which affects consistent ablation and measurement by intensive analysis is sample homogeneity. Sample homogeneity can be described by two qualities. The first quality is the randomness of a mixture. The second quality is the dispersion of the elements within a mixture.

Sample randomness is most generally described by a binomial distribution, although some approximations are useful for computation. It has been found that, when sufficiently randomized, the degree of sample variation is given by $\sigma^2 = n\ P(a) \cdot P(b)$, where "n" is the sample size, P(a) is the probability of sampling component "a," and P(b) is the probability of sampling the bulk "b," or that portion which does not include "a." Therefore, a description of the randomness is a comparison of the theoretical variance or error $\sigma^2$ to the actual measured variance or error $s^2$, and is denoted as the mixing index or efficiency "M." M is given as $M = s^2/\sigma^2$, where $s^2$ is the experimentally calculated sampling error. Note that a mixing index or efficiency approaching 1 is desired, such as 0.95 or greater, with a value of 1 representing a perfectly randomized sample.

Assuming a random mixture, the dispersion of the particles limits the sampling variance based on population. The quantifiable characteristic of dispersion is the distance between particles within the dispersing medium. This variance is defined by the previously described binomial distribution $\sigma^2 = n\ P(a) \cdot P(b)$. Since $P(a) = N_a/(N_a + N_b)$, and $P(b) = N_b/(N_a + N_b)$, the probabilities of sampling a particle of either a or b is controlled by the concentrations of a and b. The total sampling error is given as $\sigma/N_a = \sigma/(n\ P(a)) = P(B)/P(A)\ 1/\sqrt{n}$.

It should be understood that it is practically impossible to estimate theoretically the true mixing efficiency. However, experimental evidence suggests that samples prepared using a preferred embodiment of the present method have an experimental error very similar to the analytical error. This suggests that the sampling error is negligible, and that the sample has been mixed to sufficient randomization, i.e., that the mixing index M is very near a value of 1, or not experimentally significantly different from a value of 1. When compared to a reasonable, even if unlikely, lower limit of the mixing efficiency of 0.5, a mixing efficiency such as that seen in the pellets described herein is very desirable.

In terms of randomization, if powder flows are simulated as liquid flows for dry mixing, the advantages of liquid mixing are evident over any other type of mixing as summarized by I. Bauman, *Solid-Solid Mixing with Static Mixers*, Chem. Biochem. Eng. Q. 15 (4) 159–165 (2001), hereby incorporated herein by reference for all purposes.

Sample homogeneity and analytical results are linked by the fact that sampling a sufficiently large number of particles improves the precision of the analytical results. If the analysis volume is fixed, then by grinding the sample very well and producing a large number of particles, the homogeneity, i.e., sampling variance, is improved. Each laser pulse from the intensive analysis instrument analyzes approximately $140 \times 10^3\ \mu m^3$ of sample material. With an average particle diameter size of 6 µm and volume of 110 µm³, about 1,300 particles are analyzed with each laser pulse. Therefore, to analyze a concentration of 100 parts per million (ppm) with a 20% error rate or less, it is necessary to analyze 5 locations across the pellet with 30 shots or pulses for each location. Therefore, the present sample preparation method has the very favorable effect of improving homogeneity, sampling, and, ultimately, analytical results.

Turning now to the binding or cementing agent, a low concentration of the binding agent in the final sample pellet is most desirable, so as to reduce any dilution effects. The spectral signatures of the elements in the sample, which are directly related to their true abundance and hence accurate measurement, should not be significantly affected by the presence of the epoxy. Both the concentration of the epoxy and the makeup of the epoxy itself affect the accuracy of the measurements, with the minimization of such effects being most desirable. The components of the epoxy solution have been chosen so as to least interfere with LIBS analysis. Likewise, the pellet procedure described herein yields a very low concentration of the binding agent in the final pellet.

Lastly, uniform spatial distribution of the binding agent is desirable to achieve a homogeneous distribution of the binding agent within the final sample pellet. Uniform spatial distribution of the binding agent effects a homogenization of the structural integrity of the pellet, and an analytical "smoothing" of the LIBS matrix effects. Measuring the variation in binding agent concentration in different parts of the pellet can be achieved by collecting percent relative standard deviations (% RSD) of the binding agent concentrations by weight measured on a statistically significant number of subsamples from a statistically significant number of pellets. The acceptable limits for the % RSD are defined by utilitarian needs. The process described herein causes the resultant pellets to satisfy these standards.

Thus, the present process and pellets formed thereby combine structural integrity of the pellet with the several characteristics which cause consistent ablation of the sample material, a combination which has not yet been achieved in the art. Other objectives achieved by the pelletizing process described herein include a binder that allows a delay in curing, i.e., curing on demand by increasing cure temperature and decreasing cure time while allowing a short cure time without subjecting the sample to degradation due to high temperatures, as well as other objectives previously described.

The above discussion is meant to be illustrative of the principles and various embodiments of the present invention. Many variations and modifications of the invention and apparatus and methods disclosed herein are possible and are within the scope of the invention. Accordingly, the scope of protection is not limited by the description set out above, but is only limited by the claims which follow, that scope including all equivalents of the subject matter of the claims.

What is claimed is:

1. A method for analyzing a raw sample, the method comprising:
    a) measuring out a portion of the raw sample;
    b) measuring out a volume of a binding solution;
    c) combining the portion and the volume to form a mixture;
    d) grinding the mixture;
    e) pelletizing the mixture; and
    f) intensively analyzing the sample.

2. A method for homogenizing a raw sample, the method comprising:
    a) measuring out a portion of the raw sample;
    b) measuring out a volume of a binding solution, wherein the binding solution comprises a cementing agent, an activator, and a solvent;
    c) combining the portion and the volume to form a mixture; and
    d) grinding the mixture.

3. The method of claim 2 wherein the cementing agent comprises an epoxy.

4. The method of claim 3 wherein the epoxy comprises C4 Resin.

5. The method of claim 2 wherein the activator comprises Activator D.

6. The method of claim 2 wherein the solvent comprises isopropyl alcohol and acetone.

7. A method for homogenizing a raw sample, the method comprising:
    a) measuring out a portion of the raw sample;
    b) measuring out a volume of a binding solution;
    c) combining the portion and the volume to form a mixture; and
    d) grinding the mixture to form a gel.

8. The method of claim 1 further comprising:
    g) dispersing a plurality of sample particles having a mean diameter of less than 6 microns throughout the mixture.

9. The method of claim 1 further comprising:
    g) dispersing a plurality of sample particles having a particle diameter standard deviation of less than 0.01 millimeters throughout the mixture.

10. A method for homogenizing a geological substance, the method comprising:
    a) measuring out a portion of the geological substance;
    b) measuring out a volume of a binding solution, wherein the binding solution comprises a cementing agent, an activator, and a solvent;
    c) combining the portion and the volume to form a mixture; and
    d) grinding the mixture.

11. The method of claim 10 wherein the geological substance is drilled cuttings from a subterranean earthen wellbore.

12. The method of claim 1 wherein the sample is a powder metallurgy.

13. The method of claim 1 wherein the sample is a ceramic.

14. The method of claim 1 wherein the sample is a food.

15. The method of claim 1 wherein the sample is a pharmaceutical.

16. A method for homogenizing a raw sample, the method comprising:
    a) measuring out a portion of the raw sample;
    b) measuring out a volume of a first solution;
    c) measuring out a volume of a second solution;
    d) combining the sample portion, the first volume, and the second volume to form a mixture; and
    e) grinding the mixture.

17. The method of claim 16 wherein the sample portion is in the range of 0.45 grams and 0.50 grams.

18. The method of claim 16 wherein the first volume is approximately 0.50 milliliters.

19. The method of claim 16 wherein the second volume is approximately 0.50 milliliters.

20. The method of claim 16 wherein the first solution comprises C4 Resin and a carrier solution having isopropyl alcohol and acetone, wherein the ratio of grams of C4 Resin to milliliters of carrier solution is approximately 0.0633 to 1.

21. The method of claim 20 wherein the carrier solution comprises 90 percent by weight isopropyl alcohol and 10 percent by weight acetone.

22. The method of claim 16 wherein the second solution comprises Activator D and a carrier solution having isopropyl alcohol and acetone, wherein the ratio of grams of Activator D to milliliters of carrier solution is approximately 0.0158 to 1.

23. The method of claim 16 wherein step e) comprises grinding only the sample portion and occurs before step d).

24. The method of claim 16 wherein the ground mixture comprises sample particles having a mean diameter of less than 6 microns.

25. The method of claim 16 wherein the ground mixture forms a gel.

26. A method for pelletizing a raw sample, the method comprising:
 a) measuring out a first portion of the raw sample;
 b) measuring out a volume of an epoxy solution having a solvent;
 c) measuring out a volume of an activator solution having the solvent;
 d) combining the first sample portion, the epoxy solution volume, and the activator solution volume to form a spiked sample;
 e) grinding the spiked sample;
 f) heating the spiked sample; and
 g) applying a force to the spiked sample to form a first pellet.

27. The method of claim 26 wherein step f) further comprises:
 i) heating the spiked sample using a first temperature; and
 ii) heating the spiked sample using a second temperature.

28. The method of claim 27 wherein the first temperature is in the range of 350° F. to 370° F. and is used for approximately one minute.

29. The method of claim 28 wherein the second temperatures is in the range of 145° F. to 165° F. and is used for approximately 4 minutes.

30. The method of claim 29 wherein the second temperature is 155° F.

31. The method of claim 26 further comprising:
 h) curing the first pellet; and
 i) distributing a binding agent substantially homogeneously within the first pellet.

32. The method of claim 31 wherein step h) comprises applying heat to the first pellet at a temperature in the range of 350° F. to 370° F.

33. The method of claim 32 wherein the heat is applied at a temperature of 355° F. for approximately 3 minutes.

34. The method of claim 31 wherein the first pellet is approximately 98 percent by weight the raw sample and approximately 2 percent by weight the binding agent.

35. The method of claim 31 wherein the solvent is substantially evaporated.

36. The method of claim 26 further comprising re-powdering the spiked sample before step g).

37. The method of claim 26 wherein step g) is achieved using a die and a press.

38. The method of claim 37 wherein the press exerts a pressure of approximately 5 tons for approximately 18 seconds on the die, and releases from the die over approximately 12 seconds.

39. The method of claim 26 wherein step f) is achieved using a hot plate.

40. The method of claim 26 wherein step f) is achieved using ultra violet rays.

41. The method of claim 26 wherein step f) is achieved using electricity.

42. The method of claim 26 wherein the first pellet has a mixing index substantially equivalent to 1.

43. The method of claim 42 wherein the mixing index is greater than 0.95.

44. The method of claim 26 further comprising distributing a plurality of sample particles having a mean diameter of less than 6 microns throughout the first pellet.

45. The method of claim 26 further comprising distributing a plurality of sample particles having a particle diameter standard deviation of less than 0.01 millimeters throughout the first pellet.

46. A method of taking an intensive measurement of a sample, the method comprising:
 a) measuring out a first portion of the sample;
 b) measuring out a volume of an epoxy solution;
 c) measuring out a volume of an activator solution;
 d) combining the first sample portion, the epoxy solution volume, and the activator solution volume to form a spiked sample;
 e) grinding the spiked sample;
 f) drying the spiked sample;
 g) applying a force to the spiked sample to form a pellet;
 h) curing the pellet to form a binding agent; and
 i) ablating the surface of the pellet.

47. The method of claim 46 wherein step i) is achieved using a forceful beam.

48. The method of claim 47 wherein the forceful beam further comprises a LIBS analysis.

49. The method of claim 46 further comprising smoothing a plurality of sample particles.

50. The method of claim 46 further comprising analyzing the ablated pellet material.

51. The method of claim 50 wherein the analyzed pellet material is substantially free of variances in the sample material and binding agent ablated.

52. The method of claim 46 wherein the pellet maintains structural integrity during step i).

53. The method of claim 52 wherein a compressional force stress in the pellet is less than a structural threshold of the pellet.

54. The method of claim 46 wherein step i) forms a crater on the surface of the pellet, and wherein the surface of the pellet is substantially free of collateral damage near the crater.

55. The method of claim 46 wherein the first pellet is substantially free of fractures extending through the pellet.

56. The method of claim 1, wherein the binding solution comprises a cementing agent, an activator, and a solvent.

57. The method of claim 56 wherein the cementing agent comprises an epoxy.

58. The method of claim 57 wherein the epoxy comprises C4 Resin.

59. The method of claim 56 wherein the activator comprises Activator D.

60. The method of claim 56 wherein the solvent comprises isopropyl alcohol and acetone.

61. The method of claim 1 wherein step d) causes the mixture to form a gel.

62. The method of claim 1 wherein the sample is a geological substance.

63. The method of claim 62 wherein the sample is deilled cuttings from a subterranean earthen wellbore.

64. The method of claim 2 wherein step d) causes the mixture to form a gel.

65. The method of claim 2 further comprising:
   e) dispersing a plurality of sample particles having a mean diameter of less than 6 microns throughout the mixture.

66. The method of claim 2 further comprising:
   e) dispersing a plurality of sample particles having a particle diameter standard deviation of less than 0.01 millimeters throughout the mixture.

67. The method of claim 2 wherein the sample is a geological substance.

* * * * *